Figure 1:
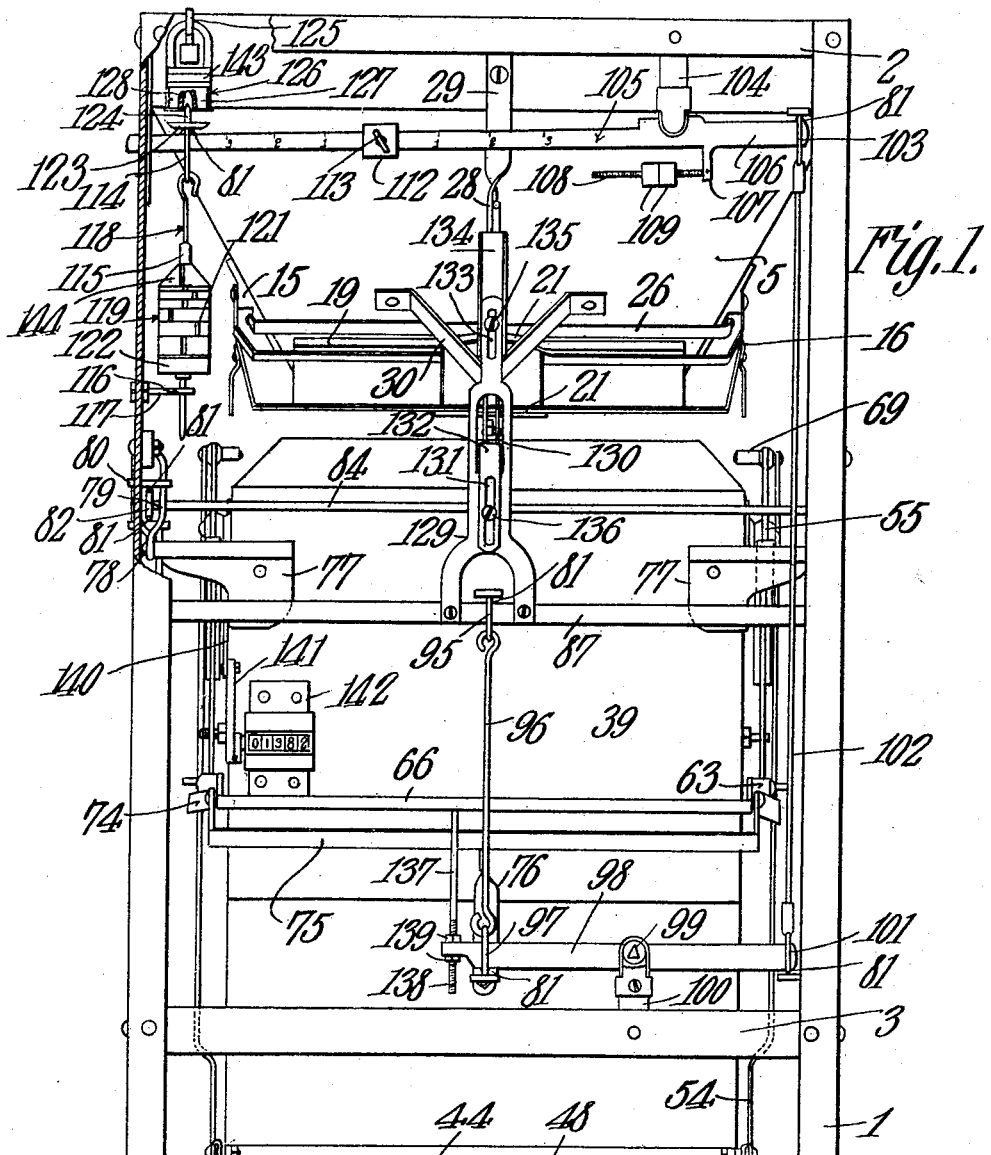

F. L. SMITH.
AUTOMATIC GRAIN SCALE.
APPLICATION FILED SEPT. 21, 1907.

907,190.

Patented Dec. 22, 1908.
4 SHEETS—SHEET 1.

Witnesses
E. F. Stewart
F. T. Chapman

Inventor
Frank L. Smith.
By C. A. Snow & Co.
Attorneys

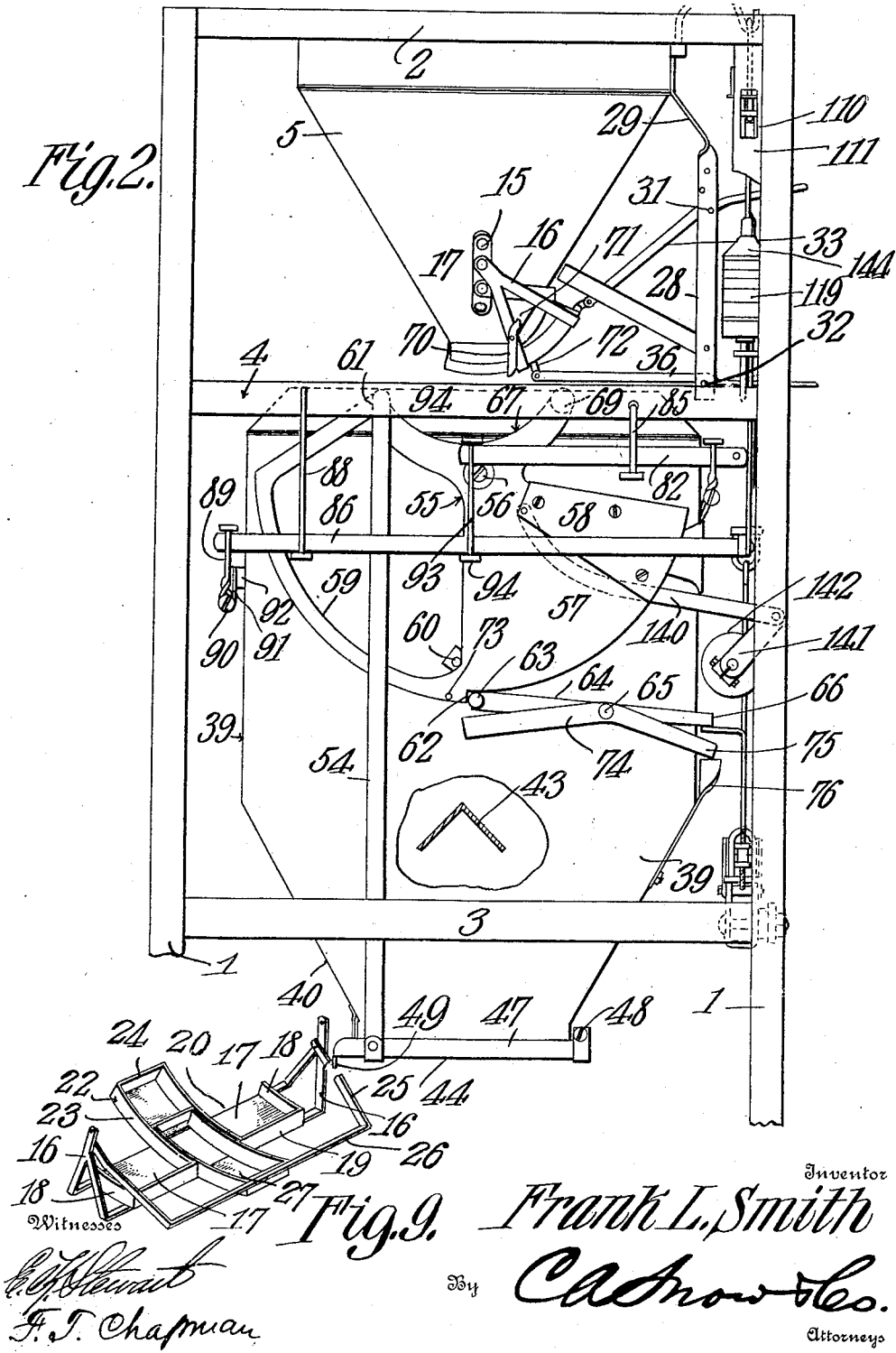

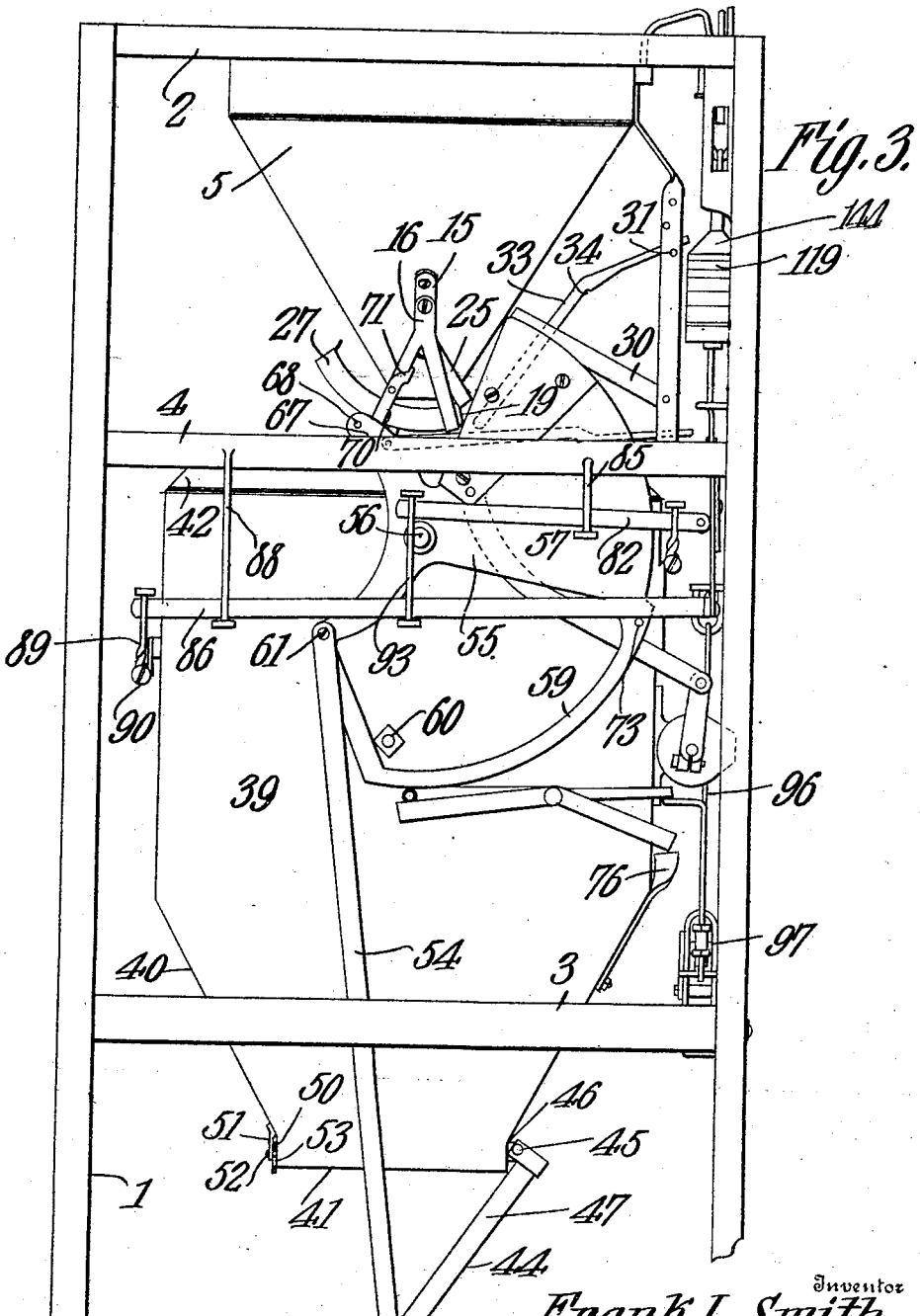

F. L. SMITH.
AUTOMATIC GRAIN SCALE.
APPLICATION FILED SEPT. 21, 1907.
907,190.
Patented Dec. 22, 1908.
4 SHEETS—SHEET 4.
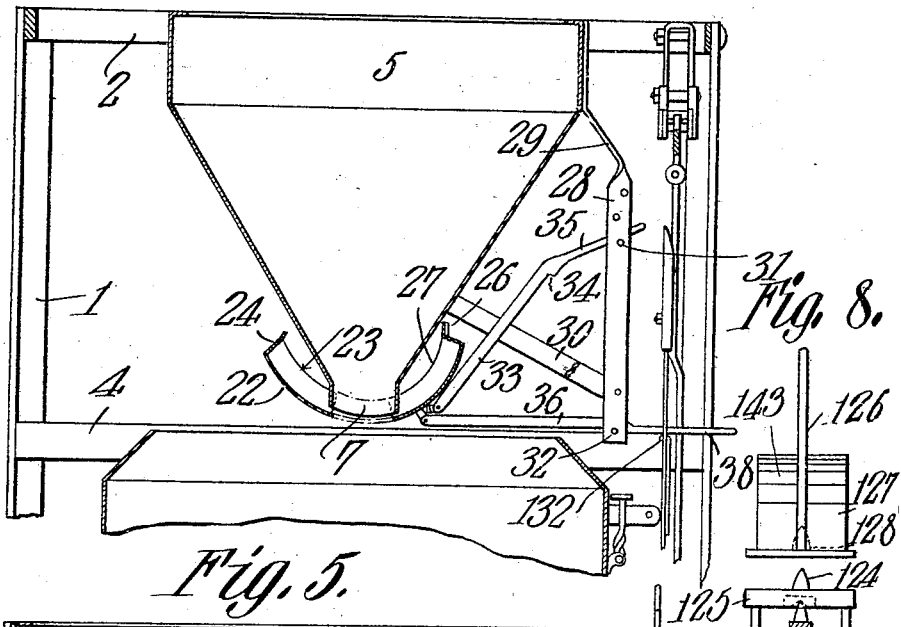
Fig. 4.
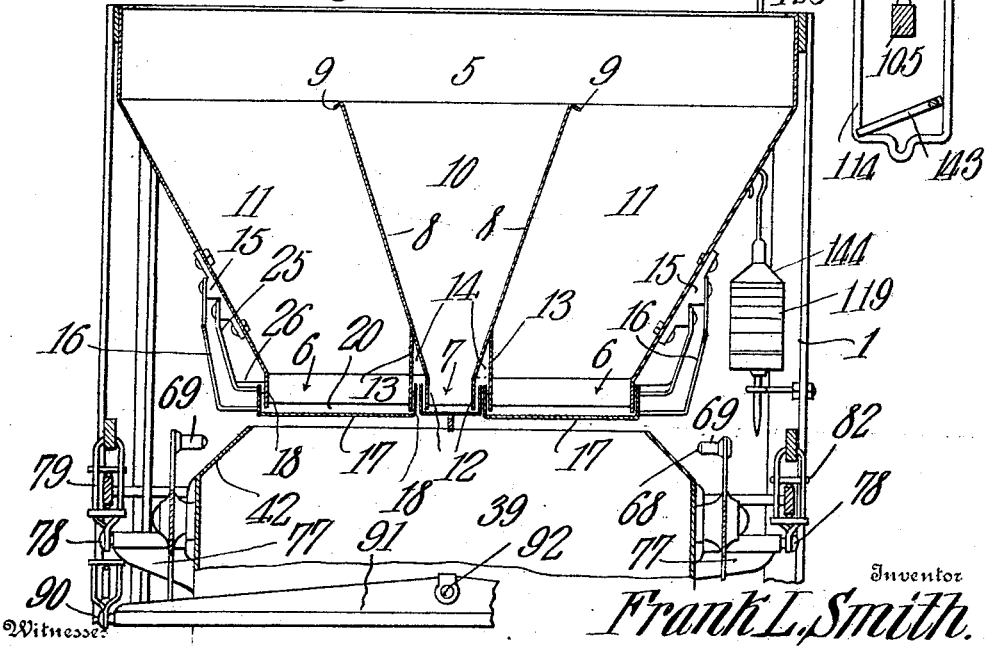
Fig. 5.
Fig. 8.
Witnesses:
Inventor
Frank L. Smith.
By C. A. Snow & Co.
Attorneys
THE NORRIS PETERS CO., WASHINGTON, D. C.

UNITED STATES PATENT OFFICE.

FRANK L. SMITH, OF PERU, ILLINOIS, ASSIGNOR OF ONE-HALF TO WILLIAM LAYCOCK, OF LIBERTYVILLE, ILLINOIS.

AUTOMATIC GRAIN-SCALE.

No. 907,190.   Specification of Letters Patent.   Patented Dec. 22, 1908.

Application filed September 21, 1907. Serial No. 393,995.

*To all whom it may concern:*

Be it known that I, FRANK L. SMITH, a citizen of the United States, residing at Peru, in the county of Lasalle and State of Illinois, have invented a new and useful Automatic Grain-Scale, of which the following is a specification.

This invention has reference to improvements in automatic grain scales, and its object is to provide a structure of this class wherein the automatic weighing is performed with great accuracy, and means are provided for the initial accurate adjustment of the weighing mechanism.

The invention comprises among other things a receiving hopper provided with a reserve compartment containing a supply of grain sufficient to keep the dribble stream full until the weighing is completed, so that the incoming stream of grain may be stopped either partially or completely at any time without affecting the accuracy of the machine.

The invention also comprises separate main and dribble valves which operate both separately and coactively and both of which may be locked open separately. By this means the main valves may be opened and the dribble valve opened but inactive, and when the main valves are closed the dribble valve may still remain open and active for a sufficient time, after which the dribble valve is closed, thus entirely cutting off the stream of grain while the machine is discharging. When the weighing hopper returns to its initial position after the grain is discharged the main valves are opened while the dribble still remains closed, so that the grain which is spouted directly into the reserve compartment of the receiving hopper first fills the latter before passing into that portion of said hopper communicating with the main valves, and the dribble reserve supply is thus always maintained.

The invention also comprises means for operating the valves, which is done automatically when the weighing hopper has been emptied and returns to its initial position, the valves being locked in the position to which they are carried and being in this position free from the mechanism moving them to such position.

The invention also comprises a dribble check operating in conjunction with the weighing beam so that when the grain in the weighing hopper overbalances the weighing beam the latter is permitted to move sufficiently to cause the closure of the main valves of the receiving hopper, thus opening the dribble valve which then supplies grain to the weighing hopper until the dribble check is overbalanced, when the dribble valve is closed and the weighing hopper is permitted to discharge.

The invention also comprises means whereby interchangeable weights are used for the main weighing beam and for the dribble check, so that by the transfer of the weights from one to the other the dribble time is increased or decreased in proportion to the number of weights transferred, and this may be done while the machine is in operation without throwing the weighing mechanism out of balance.

The invention also comprises a weighing hopper provided with a spreading hog's-back centrally located in the lower part thereof and parallel with the gate so as to spread the first of the incoming grain that enters after the valves are opened, thus preventing it acting with full force upon the gate located at the bottom of the weighing hopper and thereby preventing certain of the mechanisms being displaced by the shock which the falling body of grain might otherwise impart to the gate. Furthermore, this hog's-back serves as a tie, preventing the sides of the weighing hopper from bulging when loaded, and also takes a part of the direct pressure of the mass of grain off the gate. This last feature insures a more uniform pressure against the locks of the gate than would otherwise be secured.

The invention also comprises intermediate mechanism between the weighing hopper and the scale beam, which mechanism and its functions will be fully set out in the description following.

The invention also comprises a hand lock which prevents the machine from discharging when it is necessary to re-weigh a draft by hand or when the grain is to be sacked, thus allowing the operator to get a sack in position, after which the discharge valve of the weighing hopper may be released by the hand lock. Provision is made whereby this hand lock may be itself locked out of operative relation so as not to interfere with the automatic action of the weighing hopper, when so desired.

The invention also comprises a system of levers between the scale beam and the weighing hopper so constructed and arranged that there is a gain in leverage over the weights on the weighing beam as said beam travels upward, thus giving the weighing mechanism power to operate all the catches without checking the upward movement of the weighing beam.

The invention also comprises an adjustable trip so located as to unlock the weighing hopper gate mechanism when the scale beam is overbalanced.

The invention also comprises a self-adjusting support for the weighing hopper whereby equal pressure is brought to bear upon all the pivots of the weighing mechanism.

The invention also comprises the general construction of the weighing mechanism, which, together with the functions of the several parts, will be fully set forth in the following description.

The invention also comprises an adjustable valve trip connected with the main weighing frame, so that the main receiving hopper valves and the dribble valve may be operated in proper sequence.

The invention also comprises a two-part screw balance weight on the scale beam, whereby one weight acts as a lock for the other weight, thus preventing these balances weights from being jarred out of position in the operation of the machine.

The invention also comprises a self-adjusting float coacting with the weighing hopper gate to keep the front of the gate closed, thus preventing grain from leaking until the gate lock is released.

The invention likewise comprises a weighing hopper so constructed as to need no stiffeners.

The invention also comprises means for holding the weights on the scale beam poise so that while the weights may be placed on or removed from the poise they are effectually locked against accidental removal.

The invention in its various parts as hereinbefore set forth, and also in other parts not yet set forth, will be best understood by reference to the following description, taken in connection with the accompanying drawings forming part of this specification, in which,—

Figures 6, 7:
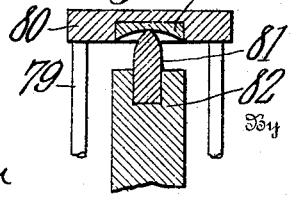

Figure 1 is a front view of the improved weighing machine; Fig. 2 is a side view thereof, with the receiving hopper valves in position to permit the grain to flow into the weighing hopper; Fig. 3 is a side view of the machine when dumping the grain from the weighing hopper; Fig. 4 is a central section through the receiving hopper and adjacent parts, showing the dribble open; Fig. 5 is a longitudinal section through the receiving hopper, with the valves all closed; Figs. 6 and 7 are detail views; Fig. 8 is a detail view of the weight carrying structures for the scale beam for regulating the length of time of the dribble. Fig. 9 is a detail view of the valve for the hopper.

Referring to the drawings, there is shown a frame which may consist of four corner posts 1, top bars 2 joining these posts, lower bars 3 also joining these posts, and side bars 4 between the top and bottom bars. Secured to the top bars 2 is a receiving hopper 5 having inclined sides approaching each other toward the bottom of the hopper, through which bottom are discharge openings 6—6 constituting the main discharge openings of the hopper, and an intermediate discharge opening 7. Extending across the hopper on each side of the opening 7 are walls 8, also inclined but stopping short of the upper edge of the hopper where these walls are over-turned, as shown at 9. The hopper 5 is thereby divided into a central compartment 10 and two side compartments 11—11, the compartment 10 communicating with the discharge opening 7 and the compartments 11 communicating respectively with the discharge openings 6. The opening 7 is flanked by the lower ends 12 of the hopper walls 8, and parallel with but spaced from these lower walls are other walls 13, whereby there is left a space 14 on each side of the opening 7 and separated by the walls 12 and 13 from both the opening 7 and the flanking openings 6. The space 14 extends entirely through the bottom side walls of the hopper 5 for a purpose which will presently appear. On the outer face of the end walls of the hopper 5 are brackets 15 to which are pivoted and from which depend frames 16 carrying valves 17 having curved lower walls corresponding to the lower edge of the hopper 5, which is also curved on an arc struck from the pivotal points of the frames 16. The valves 17 have upturned end walls 18 and an upturned front wall 19, while the rear wall of these valves is omitted, as shown at 20. These valves are so located with reference to the lower walls of the hopper 5 that the bottoms of the valves are in sufficiently close relation to the lower end of the hopper 5 to prevent the escape of grain when the valves are brought into position to close the openings 6, while the end walls 18 extend up alongside of the walls surrounding the openings 6 and into the spaces 14 between the openings 6 and the opening 7. When the valves 17 are in their normally pendent position the openings 6 are closed, but because of the open end 20 of each valve these valves may be moved out of coincidence with the openings 6 and any material in the compartments 11 will then discharge through these openings. The two valves 17 are spaced apart a distance somewhat greater than the opening 7 and are connected by bars 21, and coincident with the space between these valve members there is an arc-shaped side extension 22 having side walls 23 and an end wall 24. This side extension 22 is closed at the bottom and is so located with reference to the valves 17 that when these valves are swung on their pivots out of coincidence with the openings 6 the extension 22 is brought into coincidence with the opening 7. This will cause the discharge openings 6 to be unclosed when the valves are swung to one side but at the same time the opening 7 is closed. Pivotally connected to the brackets 15 interior to the frames 16 are arms 25 forming angle continuations of a bar 26 extending across the hopper and carrying another valve 27 of suitable size and curvature to be normally housed within the side extension 22 of the valves 17. This valve member 27 is arranged with its side walls so located as to travel through the passages 14 and under normal conditions serves to close the discharge opening 7.

For convenience of description the valves 17 will hereinafter be referred to as the main valves of the receiving hopper and the valve 27 will be referred to as the dribble valve.

Fast upon the hopper 5 is a vertical guide bar 28 secured at the upper end of the hopper by a brace 29 and at the lower end by another brace 30. The bar 28 is made of two spaced parts and passing through this bar are two pins 31 and 32. Pivotally connected to one of the connecting bars 21 of the main valves 17 is a catch bar 33 formed with a notch 34 arranged to engage the pin 31 and having an extension 35 beyond the notch 34 passing between the two members of the bar 28 and extending beyond the same. Pivotally connected to the dribble valve 27 is another catch bar 36 formed with a notch 37 arranged to engage the pin 32, and this bar has also an extension 38 passing between the two members of the bar 28 and beyond the same.

The bars 33 and 36 are so formed, and the notches 34 and 37 are so located that when the valves 17 and 27 are moved away from their normal pendent position the notches 34 and 37 will engage the pins 31 and 32 respectively and lock the valves in the displaced position.

The construction is such with relation to the main and dribble valves of the receiving hopper that when the locking catch bars 33 and 36 are in position to lock the valves in the displaced position the main discharge openings 6 are both unclosed, while, even though the dribble valve 27 is withdrawn from under the opening 7, the extension 22 of the main valves is in a position to close the opening 7. Under these conditions the openings 6 are free to discharge grain contained in the compartments 11 while any grain contained in the compartment 10 is not allowed to escape. Now, assuming that the catch lever 33 is relieved from engagement with the pin 31, the main valves will at once gravitate to their normal position, carrying the extension 22 out of coincidence with the opening 7 but the valves 17 close the openings 6. Under these conditions the outflow of grain from the compartments 11 is stopped while grain may then flow through the dribble opening 7. Finally when the catch bar 36 is released from the pin 32 the dribble valve will gravitate to a position to close the dribble opening and so the outflow of grain from the hopper 5 is entirely stopped.

In the operation of the machine the grain is spouted directly into the compartment 10 and when the latter is full the grain overflows into the compartments 11. Now, when the valves are all moved to one side about their pivots and there locked, the opening 7 of the compartment 10 is maintained closed while the main valves unclose the openings 6. Grain now flows from the compartments 11 through the openings 6, the supply being constantly maintained by the overflow from the compartment 10. When the valves 17 are closed the dribble opening is then unclosed since the dribble valve is, as will hereinafter appear, then held in the open position, and the dribble of grain continues to flow because of the reserve store of grain in the compartment 10. The parts are so proportioned that the compartment 10 shall always contain a sufficient amount of grain to supply the dribble under all conditions of operation. When, finally, the dribble valve is released the dribble opening is also closed and the entire flow of grain is stopped, but before the grain can again be supplied from the spout to the compartments 11 the compartment 10 must first be filled to overflowing.

The machine is provided with a weighing hopper 39 of general rectangular shape, with its lower end walls 40 converging to an escape opening 41. The general shape of the hopper is not unlike the weighing hoppers usually employed in grain weighing machines, but in accordance with my invention the weighing hopper is made particularly firm and rigid by the employment of an inturned flange 42 at the upper edge of the hopper, by means of which this particular portion of the hopper is strengthened and made rigid, while at a point a short distance above the discharge opening 41 the weighing hopper is provided with a hog's-back 43 connecting the plain side walls of the hopper and thus preventing these walls from bulging under the weight of the accumulated grain in the hopper. Furthermore, this hog's-back, which is centrally located over the discharge opening, diverts the incoming grain toward the inclined sides 40 of the weighing hopper and thus relieves the gate 44, closing the opening 41, from the force of impact of the falling grain. Also, the hog's-back 43 supports a portion of the grain above the same and thus relieves the gate 44 from a corresponding amount of weight so that the mechanism used to operate the gate is relieved to a corresponding extent from the strains and stresses due to the weight of the grain.

The gate 44 is pivoted by means of pivot pins 45 fast in ears 46 on one edge of the lower end of the weighing hopper, and this gate is provided with side flanges 47 and one edge flange 48, while the other edge has a down-turned lip 49. The general construction of the gate need not be different from that usually employed for this purpose, but along one side of the discharge opening 41, exterior thereto, is a longitudinal plate 50 supported by brackets 51 fast on the lower end of the hopper, and this plate has a limited vertical movement, being carried by pins 52 on the brackets 51 which enter slots 53 at right angles to the length of the plate 50. This plate 50 operates as a float for closing the end of the gate remote from its pivotal support, the said float resting by gravity upon the upper face of the gate when the latter is in a position to close the discharge opening of the weighing hopper, and following said gate for a limited distance when it moves upon its pivots away from the hopper to open the discharge end of the latter. This float automatically closes the end of the gate unprovided with a flange and so prevents the leak of grain because of a failure of the gate to close tightly against the bottom of the weighing hopper.

The gate 44 is supported by links 54, to which gate these links are connected at their lower ends. The upper ends of the links 54 are connected to counterbalance arcs 55 pivotally supported at 56 on the two sides of the weighing hopper near the upper end of the same. These counterbalance arcs are formed with a solid portion 57 to which may be applied an additional weighted piece 58, while the other side of each counterbalance arc is in the form of an open frame 59 of general segmental shape, the end walls of which have in their path a stop pin 60 projecting from the corresponding side wall of the weighing hopper, so that the travel of the counterbalance arcs is limited by the engagement of the walls of the frame 59 with this pin. The connection of each link 54 with its corresponding counterbalance arc is at a point some distance from the pivots 56 of the arcs, as shown at 61. The construction of the counterbalance arcs is such that the weighted sides 57 tend at all times to maintain the gate in closed position but when grain is deposited in the weighing hopper 39 these counterbalance arcs are overbalanced and the gate 44 is forced away from the closed position, so that the grain is enabled to escape. However, where the peripheral portion of the frame 59 joins the weighted portion 57 there is an inset or notch forming a shoulder 62, and in the path of this shoulder there is a pin roller 63 on the end of an arm 64 pivoted to the corresponding side of the hopper 39, as shown at 65. There is an arm 64 for each counterbalance arc 55 and the arms 64 are connected by a cross bar 66 integral with the arms 64 and extending across that part of the weighing hopper which for convenience may be designated the front of the hopper.

When the parts are in their normal position the weight of the cross or connecting bar 66 is sufficient to overbalance the ends of the lever arms 64 carrying the pins 63, and these pins are therefore maintained in contact with the shoulders 62, thus preventing the counterbalance arcs from moving on their pivots under the impulse of the weight of the grain acting on the gate 44. However, when the arms 64 are turned on their pivots and the connecting bar 66 is moved upward against the action of gravity in a manner to be described, the pins 63 are moved downward out of the path of the shoulders 62, and this is facilitated by the pins having rollers engaging these shoulders 62.

Assuming that there is a charge of grain in the weighing hopper 39, it will be seen that as soon as the pins 63 are moved out of the path of the shoulders 62 the charge of grain, if heavy enough, will move the gate 44 away from contact with the lower end of the hopper 39, against the action of the weighted ends 57 of the counterbalance arcs, and the grain will therefore be discharged through the opening 41, as will be readily understood.

Each arc is provided with an arm 67 extending in an upward direction from the pivot point of the arc and which is provided at its end with a laterally projecting pin 68 carrying a roller 69.

Pivotally supported upon the frames 16 carrying the main valves for the hopper 5 are pendent catches 70, each having one end in the path of the corresponding roller 69 and having the other end provided with an extension 71 which when the catch 70 is moved in one direction will engage a portion of the frame 16 and so hold the catch 70 against movement about its pivot in a corresponding direction. Now, when the counterbalance arcs are released and moved about their pivots by the overbalancing action of the grain in the hopper 39 the rollers 69 will engage the catches 70 and ride under them because they are made free to move in a direction permitting this action. However, when the grain has been discharged from the hopper 39 and the counterbalance arcs become active to return the gate 44 to its normal position the rollers 69 again engage the catches 70, but, these catches being held against movement in a corresponding direction with relation to the frames 16, the said frames are constrained to move about their pivots by the engagement therewith of the counterbalance arcs when they return to the normal position under the action of gravity. This motion continues until the rollers 69 ride under the lower ends of the catches 70 and so escape from them. In the meantime, however, both the main and dribble valves of the hopper 5 have been turned on their pivots until the catch arms 33 and 36 have become locked on the pins 31 and 32.

The simultaneous movement of the main valves 17 and the dribble valve 27 in the direction to lock them in the position just described is caused by a stud 72 projecting from the bottom of the dribble valve into the space between the connecting strips 21 of the two main valves 17, and it is to this stud 72 that the catch bar 36 is pivoted. Now, when these valves are in their normal closed position the stud 72 is against and in the path of one of the connecting strips 21, so that the main and dribble valves are constrained to move together in the direction in which they are impelled by the engagement of the rollers 69 with the catches 70, but this does not interfere with the return movement of the main valves 17 under the action of gravity when released, while the dribble valve is still held in the position to which it was carried by the return movement of the counterbalance arcs.

From each counterbalance arc adjacent to the shoulder 62 there projects a pin 73. Mounted upon the pivots 65 are lever arms 74 connected by a cross bar 75 extending across the front of the machine. The free ends of the levers 74 are movable into and out of the path of the pins 73 and a stop finger 76 is pivotally supported upon the hopper 39 in such position that it may be moved into and out of the path of the cross bar 75. The pivotal support of the finger 76 is so constructed that this finger, while movable about the pivot, is held frictionally in any adjusted position. When the finger 76 is moved to one side about its pivot so that its upper end is out of the path of the crossbar 75, the latter will move by gravity until the free ends of the levers 74 are in the path of the pins 73, while when the finger 76 is moved into the path of the cross bar 75 the latter is held in an elevated position, thus depressing the free ends of the levers 74 to a position out of the path of the pins 73. The levers 74 with the cross bar 75 constitute a hand lock which, when the finger 76 is moved out of its path, will prevent the counterbalance arcs from being actuated by the weight of the grain in the hopper 39 even through the pins 63 are moved out of coincidence with the shoulders 62.

As will hereinafter appear, it is intended that the action of the device as a whole shall be automatic, and for this reason it is designed that the dumping of the hopper 39 shall occur under normal conditions when the pins 63 are moved out of the path of the shoulders 62 by mechanism still to be described. But under some conditions it is desirable that the hopper 39 be prevented from dumping even though the weighing of the grain has been completed and the several parts have been moved to a position which would permit the dumping of the grain automatically. For instance, it may be desirable to re-weigh a charge of grain, or it may not be desirable to dump a charge of grain while the machine is being adjusted for proper weighing, or it may be desirable to sack the grain in which case the dumping of the hopper 39 is delayed until the operator has time to adjust a sack to receive the grain. Under these several conditions the hand lock is useful for when it is in operative relation to the pins 73 the dumping of the hopper 39 is prevented until such time as the operator may manually move the hand lock to a position which will cause the free ends of the levers 74 to move out of the path of the pins 73 and thus permit the weight of the grain to act on the counterbalance arcs and thus free the gate 44. When the hand lock is not to be used the finger 76 is moved into its path and the lock is thereby moved out of the path of the pins 73.

For the purpose of automatically weighing the grain, I provide means which overcome certain objectionable features of prior grain weighing machines, and this structure I will now proceed to describe.

Fast upon the front of the hopper 39 near the upper end thereof are two laterally projecting brackets 77. Each of these brackets carries a pin 78 on which is mounted a yoke 79 terminating in a bridge piece 80 having a socket for the reception of a pivot pin 81 projecting upward from the upper edge of a straight bar 82 forming part of the weighing mechanism. The preferred form of pivotal connection for the several parts of the weighing mechanism is best shown in detail in Fig. 6. Referring to this figure more particularly, it will be seen that the bar 82, which may be taken as indicative of any of the weighing connections hereinafter referred to, between the scale beam and weighing hopper, is provided with a pin 81 inset in said bar, while the bridge piece 80 has a socket piece 83 inset therein and is suitably hollowed out to receive the pivot pin 81. By forming the pivotal connections in this manner the pin 81 and socket piece 83 may be made of hardened or tempered steel while the bridge piece 80 and bar 82 may be made of soft steel. By so constructing the parts just described the danger of breakage is reduced to a minimum and there is no danger of cracking the parts in tempering. Besides this, it is possible to impart a more uniform temper to the tempered parts than would be the case were the tempered parts made of one piece with the untempered parts.

There is a bar 82 on each side of the hopper 39 and the ends of the bars adjacent to the brackets 77 are connected together by a connecting rod 84 for simultaneous movement.

At an intermediate point in the length of each bar 82 and on the bottom edge thereof is formed another pivot pin 81 engaged by a yoke bearing 85 hung pendently from the corresponding bar 4 of the main frame, which bar may be perforated for the purpose, or this yoke may be otherwise supported on the bar. Below each bar 82 is another bar 86 connected across the front of the hopper 39 by an integral coupling bar 87 and each bar 86 is fulcrumed in a fixed saddle 88 secured to and depending from the cross bar 4 near the rear side of the hopper 39. Each saddle 88 supports its bar 86 by a pin pivot like that described with reference to Fig. 6, the pin on the bar projecting downward from the under edge thereof. The free end of each bar 86 projects a distance beyond the rear wall of the hopper 39 and there carries a yoke hanger 89 supported upon a pin connection similar to that shown in Fig. 6, the pin in this instance projecting from the upper edge of the corresponding bar 86. The lower end of each yoke 89 encircles a pin support 90 on the corresponding end of a pivoted supporting arm 91 extending entirely across the back of the hopper and beyond the sides thereof, this arm having its pivot support midway of its length and at a point above the ends, as indicated at 92.

The end of the bar 82 remote from that connected to the hopper 39 is connected to the bar 86 by a link 93 terminating in cross heads 94 each of which is formed similar to the yoke 80 with an inset hardened bearing socket 83, and although this particular structure is not shown in the drawings in this particular location it is to be so understood. It is to be noted that the link 93 engages the upper edge of the bar 82 and the under edge of the bar 86. The coupling bar 87 connecting the two side bars 86 is provided midway of its length on its upper edge with a pivot pin 81 supporting a pivot yoke 95 which, in turn, is connected by a link 96 to another pivot yoke 97 engaging a pin 81 on the lower edge of another bar 98. This bar 98 is provided midway of its length with knife-edge bearings 99 engaging suitable seats in a post 100 rising from the bar 3 of the main frame extending across the front of the framework. The bar 98 is provided with another pin 81 on its lower edge on the end remote from that carrying the first-named pin 81 and equi-distantly located with reference to the knife-edge 99. Because of the function of the bar 98 and its manner of operation it may be termed a walking beam bar, and the pin 81 remote from that engaging the yoke 97 is engaged by another yoke 101 which, in turn, is connected by a link 102, extending to near the top of the frame, to another pivot yoke 103. Extending downward from the cross bar 2 at the front of the machine is a supporting bracket 104 in which is pivoted a scale beam 105, in general form and function similar to an ordinary scale beam. The shorter end 106 of this scale beam is provided with a pivot pin 81 on its upper edge and this pivot pin is engaged by the pivot yoke 103 before mentioned. Extending downward from the short arm 106 of the scale beam is a lug 107 from which projects a threaded rod 108, parallel with the scale beam and carrying two screw balance weights 109, after the manner of an ordinary scale beam except that these balance weights, being made in two parts, may after adjustment be screwed together so tightly as to lock both of them in place and thus prevent accidental displacement due to the shocks and jars which may result from the operation of the machine. The longer end of the scale beam projects through a guiding slot 110 formed in a plate 111 fast to one of the uprights 1 of the frame. This slotted plate serves to limit the movement of the scale beam in both directions about its knife-edge bearings.

Upon the scale beam there is an adjustable weight 112 which may be provided with a locking thumb-screw 113, or any other means for securing the weight upon the scale beam may be used. The zero point of the scale beam is placed about midway of the length of that arm traversed by the weight 112 and the scale beam is graduated in both directions from its zero point. Near the outer end of the long arm of the scale beam, on the upper edge thereof, is a pivot pin 81 engaged by a pivot link 114 which, in turn, carries the stem 115 of a counterpoise weight support, the lower end of which stem may be guided by an eye 116 formed on the end of a bracket 117 fast on the corresponding corner post of the framework. The counterpoise stem is made of less diameter at the upper end 118 than elsewhere, so that weights 119, best shown in Fig. 7, with eyes 120 of such size as to slip easily over the larger portion of the stem 115 and provided with radial slots 121 extending from the periphery to the eye, may be slipped over the reduced portion 118 of the stem, the slots being of suitable size for this purpose, and then allowed to fall until stopped by the fixed support 122 for the weights upon the counterpoise stem. The radial slot in each weight is too narrow to permit the passage therethrough of the enlarged portion of the counterpoise stem, and, therefore, when the weights are placed upon the stem so that the enlarged portion thereof passes through the eyes 120 these weights are effectually locked against displacement. The pivot yoke 114 is provided with a laterally extended cross bar 123 and above this cross bar there is an upwardly extending pin 124. Fast on the hopper 5 or some other fixed portion of the machine, at the upper end thereof, is a bracket 125 from which depends a carrier 126 having at its lower end a platform 127 upon which weights may be placed. This platform is provided with a central axial recess 128 for receiving the pin 124 and guiding the same until the carrier 126 is engaged by the cross bar 123.

In the practical embodiment of the machine the carrier 126 is of such size as to receive weights 143 which may be used interchangeably upon the link 114 and carrier 126, these weights being notched upon the edges at diametric points to fit between the legs of the link 114 and carrier 126, as the case may be. The weights 143 may be smaller and lighter than the weights 119.

Secured to the connecting bar 87 midway of its length is an upright or standard 129 having its lower end bifurcated so as to straddle the yoke 95. This standard has a longitudinal slot 130 and also carries a longitudinally adjustable, slotted plate 131 having one end 132 inturned so as to project into the slot 130. Above the slot 130 the standard is narrowed and is provided with another longitudinal slot 133, while the narrowed portion is embraced by a trough-shaped sliding piece 134 secured to the standard by a screw 135 extending through the slot 133.

The plate 131 is secured to the standard by a screw 136 extending through the slot in said plate. The standard 129 is so located that when the catch bar 33 is in the position where it is locked upon the pin 31 the end 35 projects into the path of the upper end of the sliding piece or plate 134, and when the catch bar 36 is similarly located and caught upon the pin 32 the end 38 thereof extends through the slot 130 of the standard 129 above the plate 131. The purpose of this standard 129 will be set forth when the operation of the machine is described.

The walking beam bar 98 is extended a short distance beyond the point of connection with the yoke 97, and there carries a vertically adjustable rod 137 having a threaded end 138 passing through the bar 98 and there fitted with lock nuts 139. The upper end of this bar 137 is inturned toward the front face of the hopper and its inturned end is so located as to engage the under edge of the cross bar 66 controlling the roller pin locks for the counterbalance arcs 55. The purpose of this rod 137 will also presently appear.

Pivotally secured to one of the counterbalance arcs 55 is a link 140 connected to the arm 141 of a suitable counter mechanism 142.

The operation of the structure just described is as follows:—First, to balance the machine, all the weights 119 are removed and the sliding, or, as it may be termed, the correction weight 112 is moved to the zero position. Now the scale beam is brought to balance by means of the balance weights 109; that is, the weights 109 are so adjusted that the weights 105 will lift the carrier 126, the scale beam which may be termed the check poise, very slowly. Now, the desired number of weights 119 are placed upon the counterpoise and the valves 17 and 27 are pulled open until the catches 33 and 36 act. Also, the finger 76 is moved to one side so that the hand lock lever arms 74 are brought into the path of the pins 73. The grain is now started running into the reserve compartment 10 which is thereby filled and the grain overflows into the other compartments 11 and from thence through the passages 6 into the weighing hopper 39. When sufficient grain has passed into the weighing hopper to overcome the weights 119 the scale beam rises until it is checked by contact with the check poise 126. The sliding piece 134 is so adjusted with relation to the standard 129 that by the movement of the scale beam to the extent just noted the upper end of this piece is brought into engagement with the end 35 of the catch rod 33 and the latter is released from engagement with the pin 31, so that the main valves 17 are allowed to fall by gravity to their normal position, closing the openings 6, and at the same time the extension 22 is brought out of coincidence with the dribble opening 7 and the grain contained in the reserve compartment 10 is allowed to dribble into the weighing hopper 39. When sufficient grain has in this manner entered the weighing hopper to overcome the weight of the check poise 126 the weighing beam rises until stopped by engagement with the upper end of the slot 110 in the plate 111. This last movement of the scale beam has caused the upward movement of the standard 129 sufficient to bring the plate 131 into engagement with the end 38 of the catch rod 36 and the dribble valve 27 has therefore been released and falls by gravity to a position to close the dribble opening 7. The final movement of the scale beam and the parts connected therewith due to the downward movement of the weighing hopper under the weight of the received grain, has brought the rod 137 into engagement with the connecting bar 66 and so turned the levers 64 on their pivots to an extent to move the roller pins 63 out of the path of the shoulders 62 on the counterbalance arcs, thus releasing the gate 44 from its locked position so far as the pins 63 are concerned. However, the weighing hopper is not permitted to dump because of the hand lock which is in the path of the pins 73. During this time the incoming grain again fills the compartment 10 and overflows into the compartments 11 of the hopper 5 but does not flow into the weighing hopper 39 since the main and dribble valves are at this time closed. Now, the scale beam is drawn down to a position to be just in contact with the check poise and the sliding correction weight is moved toward the end of the beam until the beam lifts this check poise with the same slow speed it did when balancing. After this has been accomplished the hand lock is moved to release the counterbalance arcs 55 and the contents of the weighing hopper are allowed to discharge by the opening of the gate 44. The correction weight 112 on the weighing or scale beam is now moved to the corresponding number on the opposite side of zero, thus deducting the amount of grain in excess of the correct weight from the amount of the succeeding draft, thus giving the correct weight. Now, the finger 76 is moved to the upright position, thus bringing the hand lock out of action, and the weighing then proceeds automatically. Should the machine dribble too long weights 143 may be transferred from the upper or check poise to the link 114 on the counterpoise so as to thus regulate the time for dribbling. This will affect the weighing in no way unless the dribble time is so much shortened that the weighing beam cannot come to a standstill.

The structure of the weighing mechanism, that is, the connections between the scale beam and the weighing hopper, is so arranged that there is a gain in power to work the trips. This is done by placing the pivots in the weighing mechanism out of line, that is, the ones supporting the weighing levers on the main frame are all on the under side of the several bars making up the weighing system of levers, and the pivots supporting the weighing hopper are placed on the upper sides of the bars. Thus, when the weighing beam rises and the weighing hopper descends the pivots supporting the weighing hopper have an outward and downward movement following the arc of a circle of which the pivot in contact with the main frame is the center. In this manner the grain in the weighing hopper gains leverage over the weights on the scale beam, and instead of balancing each other, as in the ordinary scale, the scale beam travels upward with increasing speed and power in proportion to the difference in height between these pivots. The weighing mechanism is thus given power to lift all catches without checking the upward movement of the beam. This power is also increased by placing both pivots of the walking beam 98, connecting it to the weighing mechanism, below the line of the knife-edge bearing 99. When the scale beam rises both pivots move through an arc of which the knife-edge is the center. The outer pivot connected with the scale beam moves inward toward the central point at the knife-edge, while the inner pivots connected with the weighing frame move from said center line, thus gaining leverage. The gain and loss in both places is proportionate to the distance of the points of the pivots below the knife-edge.

While I have described the lever system units as connected by pivots composed of pins and sockets, it will be understood that knife-edge pivots may be used instead of such pin and socket pivots, without affecting the gain in leverage.

Reverting to the effect of the weights 143, it may be added that by changing these weights, which may be a special set of weights of different thicknesses, from the check poise 126 to the link 114, or from the link 114 to the check poise 126, as the case may be, the time of dribbling may be adjusted to a nicety.

When the weights 119 are in place upon the counterpoise stem 115 then there is placed on top of these weights a conical cap weight 144 to prevent grain, which mights otherwise lodge on the top of flat weights, from accumulating thereupon and so disturbing the accuracy of the apparatus. This weight 144 is always used and is therefore a constant factor to be taken into account when adjusting the apparatus.

I claim:—

1. In grain scales, a receiving hopper provided with central and side compartments, the central compartment constituting a reserve receptacle for grain and from which the grain overflows into the side compartments, all the compartments being open at their lower ends, connected valves in operative relation to the open ends of the side compartments and provided with an unalined valve section for closing the central compartment when the side compartments are opened, and another valve for the central compartment for controlling the discharge opening of said central compartment when the valves controlling the openings of the side compartments are in the closed position.

2. In grain scales, a receiving hopper having main discharge openings and provided with a reserve compartment also having a discharge opening, pendently supported valves for the main and reserve compartments, said valves being all connected together, the valve for the reserve compartment being displaced with relation to the main valves, another pendently supported valve for the reserve compartment, and means for separately operating the separate valves.

3. In grain scales, a receiving hopper having main grain compartments and a separate dribble-supply compartment, all the compartments being open at their lower ends, valves for all the compartments normally closing the lower ends thereof and movable together to a position to open the lower ends of the compartments, a supplemental valve carried by the main valves and displaced with relation thereto for closing the dribble compartment when the valves are all moved to the open position, means for holding all the valves in the open position, and means for independently releasing the main and dribble valves.

4. In grain scales, a receiving hopper having main grain compartments and a separate dribble-supply compartment, all the compartments being open at their lower ends, valves for all the compartments normally closing the lower ends thereof and movable together to a position to open the lower ends of the compartments, a supplemental valve carried by the main valves and displaced with relation thereto for closing the dribble compartment when the valves are all moved to the open position, means for holding all the valves in the open position, a weighing hopper for the grain in operative relation to the receiving hopper, and connections between the weighing mechanism and the valves for releasing the main valves and the dribble valve consecutively.

5. In a grain weighing machine, a receiving hopper having a reserve compartment for supplying the dribble stream, independently acting valves for the main and dribble streams, in operative relation to the receiving hopper, catches for holding the valves in the open position, a supplemental valve carried by the main valves and displaced with relation thereto so as to close the opening in the dribble compartment when the main valves are opened, a weighing hopper in operative relation to the receiving hopper, a scale beam and connections between the same and the weighing hopper, and other connections between the last-named connections and the catches controlling the valves for releasing the main valves and the dribble valve in the order named.

6. In a grain weighing machine, a counterpoise scale beam therefor, a check poise for the scale beam having movable weights, said check poise being located in the path of the scale beam for arresting the latter until the check poise is overbalanced, a holder for the check poise weight, said holder being carried by the scale beam and carrying the counterpoise, so that the said poise weights may be interchanged between the check poise and carrier for the weights to control the length of time of dribbling without affecting the accuracy of weighing.

7. In a grain weighing machine, a scale beam, a counterpoise therefor, a link support for the counterpoise carried by the scale beam, a check poise supported independent of the scale beam but in the path thereof, and movable weights adapted interchangeably to the check poise and the link supporting the counterpoise, so that said weight may be placed upon either the check poise or the link to control the length of time of dribbling without affecting the accuracy of weighing.

8. In a grain weighing machine, a receiving hopper, a dribble reservoir therein, separate valves for the receiving hopper and the dribble reservoir, separate catches for said separate valves, a weighing hopper, a scale beam, connections between the scale beam and weighing hopper, a check poise in the path of the scale beam, and means under the control of the scale beam for releasing the main valves of the receiving hopper by the movement of the scale beam until arrested by the check poise, and for releasing the dribble valve when the scale beam actuates the check poise.

9. In a grain weighing machine, a weighing hopper, a gate for the discharge end thereof, counterbalance weights connected to the gate for maintaining the latter in the closed position, a lock for the counterbalance weights, a scale beam and connecting mechanism for the hopper, connections between the weighing mechanism and the lock for the counter weights for releasing the latter when the scale beam is overbalanced, a receiving hopper, and valves for the receiving hopper having connections in the path of the counterweights when moving in the direction to close the gate to the weighing hopper.

10. In a grain weighing machine, a weighing hopper, automatic releasing and discharging mechanism therefor, and a hand lock for preventing the hopper from discharging when released by the automatic means.

11. In a grain weighing machine, a weighing hopper, automatic releasing and discharging mechanism therefor, a hand lock for preventing the hopper from discharging when released by the automatic means, and means for holding the hand lock out of operative relation to the automatic means.

12. In a grain weighing machine, a weighing hopper, automatic releasing and discharging mechanism therefor, a hand lock for preventing the hopper from discharging when released by the automatic means, and a finger on the weighing hopper movable into and out of the path of the hand lock for maintaining the latter in an inoperative position or releasing it to move into active position.

13. In a grain weighing machine, a weighing hopper, bar levers having pivotal connections from their upper edges to said hopper, other pivotal supports to fixed portions of the structure engaging said bars on their under edges, a scale beam, a walking beam between the scale beam and the levers connected to the hopper, said walking beam having pivotal supports near its upper edge, and pivotal connections between the scale beam and the walking beam and between said walking beam and hopper supporting levers having pivotal connections with the walking beam at points below the pivotal support of said walking beam.

14. In a grain weighing mechanism, a weighing hopper, a gate for the same, means for maintaining the gate in a closed position but responsive to the weight of grain accumulated in the weighing hopper to allow the gate to open, a lock for the gate controlling mechanism, a weighing beam and connections between the same and the hopper, and an adjustable trip carried by said connections and arranged to engage the lock for the gate controlling mechanism when the scale beam is overbalanced by the weight of grain in the hopper.

15. In a grain weighing machine, a weighing hopper, a scale beam, connections between the latter and the hopper, and a self-adjusting support extending across the hopper and pivotally connected thereto at a central point and pivotally connected to the weighing mechanism at the ends.

16. In a grain weighing machine, a weighing hopper, a weighing mechanism therefor consisting of straight bar connections having pivotal bearings rigid with the main frame of the machine, other straight bar connections pivotally connected to the first-named connections and having swinging pivotal connections to the main frame of the machine, pivotal connections between the bar members and the weighing hopper, a scale beam and other pivotal connections between the bar members and the scale beam.

17. In a grain weighing machine, a weighing hopper, a supporting mechanism therefor comprising a straight bar member having rigid pivotal supports upon the main frame of the machine, said pivotal supports engaging the under edges of said bar member, other pivotal supports between the bar member and the hopper, said pivotal supports engaging the upper edge of said bar member, a second bar member, pivotal supports thereupon hung pendently from the main frame of the machine and engaging the under edges of said second bar member, pivotal connections between the two bar members, other pivotal connections between the upper edge of the second bar member and the hopper, a pivotally supported walking beam connection, pivotal connections between the first-named bar member and the under edge of the walking beam in a plane below the plane of the pivotal support of the walking beam, a scale beam, and pivotal connections between the scale beam and the lower edge of the walking beam member.

18. In a grain weighing machine, a receiving hopper, main and dribble valves therefor, a weighing hopper, weighing mechanism for the latter, catch members carried by the valves of the receiving hopper, and adjustable means carried by the weighing mechanism, engaging the catch members on the valves to first release the main valves as the scale beam is overbalanced and then to release the dribble valve.

19. In a grain weighing mechanism, a receiving hopper having a reserve compartment to supply a dribble stream, valves for the receiving hopper, another valve for the dribble compartment, a weighing hopper, a scale beam, a check poise in operative relation to the scale beam, connections between the scale beam and the weighing hopper, catches on the main and dribble valves of the receiving hopper for holding the same in open position, and adjustable stops carried by the weighing mechanism and arranged to engage the catches of the main and dribble valves to release the same in the order named.

In testimony that I claim the foregoing as my own, I have hereto affixed my signature in the presence of two witnesses.

FRANK L. SMITH.

Witnesses:
TARYDEN SANDERS,
O. M. KIRKPATRICK.